April 29, 1941.   I. E. MUSKAT   2,240,343
MATERIAL TREATMENT
Filed Nov. 26, 1937
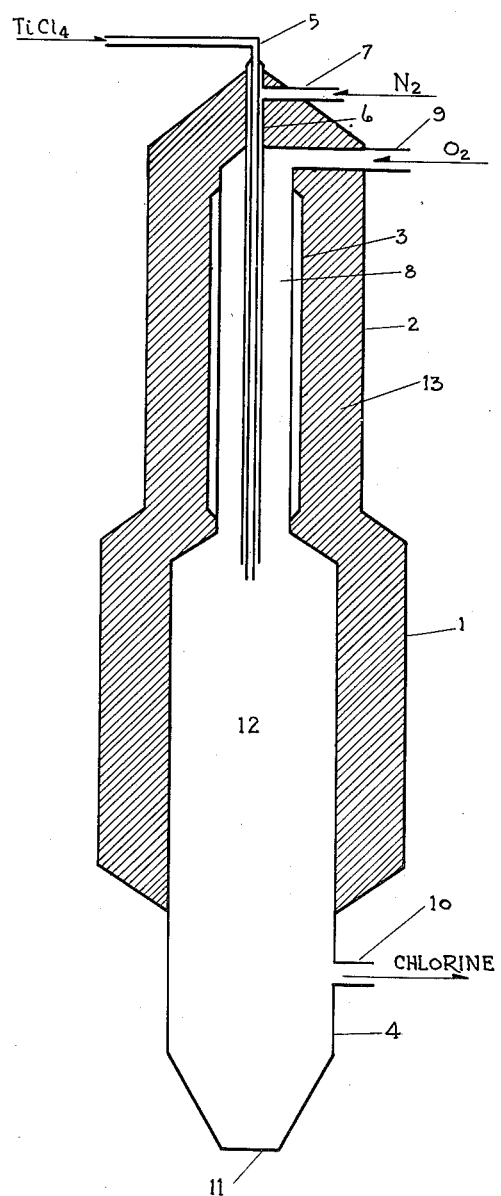
INVENTOR
IRVING E. MUSKAT
BY Raymond G. Gehrudohn
ATTORNEY.

Patented Apr. 29, 1941

2,240,343

UNITED STATES PATENT OFFICE 2,240,343

MATERIAL TREATMENT

Irving E. Muskat, Akron, Ohio, assignor to Pittsburgh Plate Glass Company, Allegheny County, Pa., a corporation of Pennsylvania Application November 26, 1937, Serial No. 176,647

17 Claims. (Cl. 134—58)

This invention relates to the production of titanium dioxide from certain halides thereof and especially from titanium tetrachloride.

Prior to the present invention it has been proposed to produce titanium dioxide by thermal decomposition of titanium tetrachloride. In general, when this process is attempted, the major portion product produced is in the form of large, irregularly-shaped crystals of poor color which are unsatisfactory for use as a pigment. Often, the formation of these agglomerates is of such magnitude as to cause plugging of the reaction chamber after a short period of operation to such an extent that it is necessary to stop the process in order to clean the chamber. The efficiency of this process as a means for securing pigmentary material has been so low that the production of titanium dioxide pigment in this manner has not been considered commercially practical.

In accordance with my invention, finely divided titanium dioxide pigment of good color may be produced without the formation of substantial amounts of large crystals by thermal decomposition of certain halides of titanium, suitably, titanium tetrachloride under the conditions of operation hereinafter described. It has been found that the formation of large crystals may be inhibited by maintaining the titanium tetrachloride out of substantial contact with hot surfaces during thermal decomposition. Apparently, when titanium dioxide is formed adjacent to hot surfaces, as for example, the walls of the reaction chamber, crystals thereof deposit thereupon and serve as seeds which grow to form the large crystal agglomerates previously mentioned. If the vaporized titanium tetrachloride is decomposed in a gaseous medium before it contacts the walls of the reaction chamber or other hot surface, such seeds do not have the opportunity to grow in this manner.

The thermal decomposition of the titanium tetrachloride is generally secured in the vapor state, and if desired, the titanium tetrachloride may be vaporized prior to its introduction into the reaction chamber. This is in no way necessary as the tetrachloride may be vaporized in the reaction zone. In order to inhibit the growth of crystals at the point of introduction of the titanium compound, it is usually desired to maintain a body of inert or nonoxidizing gas which is substantially unreactive to titanium tetrachloride adjacent the inlet whereby the incoming titanium compound may be introduced into the oxidizing atmosphere through this gaseous medium and the inlet itself may be out of substantial contact with an oxidizing atmosphere. This may be done, for example, by introducing the vapor through a nozzle, establishing an atmosphere of an inert or nonoxidizing gas therearound and continuously introducing enough inert gas to move a stream of the gas and the vapor from the nozzle into the oxidizing atmosphere. In accordance with another method, drops of liquid titanium tetrachloride may be permitted to fall through an inert atmosphere and thence into the oxidizing zone. Nitrogen may be used as the inert gas but this is not essential since other inert or nonoxidizing gases such as carbon dioxide, helium or neon may be suitable. The process may be carried at pressures above, at or below atmospheric pressure.

The temperature at which thermal decomposition of titanium tetrahalide is to be secured, may be varied considerably depending largely upon the results desired. At lower temperatures, however, titanium dioxide is formed in lower yields than that produced at higher temperatures and usually it is found that a suitable product may be produced with maximum yield of pigmentary material at temperatures from 1500–1850° F. Higher temperatures may be used but appear to cause an increase in the production of large crystals which are unsatisfactory for use as a pigment.

The titanium tetrachloride vapor, oxygen and inert gas may be preheated to reaction temperatures prior to their introduction into the reaction chamber if desired. Suitable heating devices may be provided to maintain the temperature of the preheater and the reaction chamber at the required value. An electric resistance heater or an electric arc furnace may be satisfactory for this purpose but other convenient heating means may be provided.

The following examples illustrate the process:

*Example I.*—Oxygen and titanium tetrachloride vapor in the proportion of 3.3 moles of oxygen to one of tetrachloride were continuously introduced into a reaction chamber of sufficient size to permit thermal decomposition of the titanium tetrachloride before any substantial portion thereof contacted the walls of the chamber. A temperature of 1800° F. was maintained in the chamber. A stream of nitrogen was caused to flow along the titanium tetrachloride inlet nozzle of sufficient magnitude to prevent substantial amounts of oxygen from contacting the tetrachloride at that point and the gases were withdrawn from the reaction chamber into a settling chamber where titanium dioxide was recovered. The process was operated continuously and a 98.1% yield of soft finely divided titanium dioxide of high tinting strength and good color was produced. The amount of coarse crystals produced was negligible.

*Example II.*—A similar process was carried out at the same temperature and in the same manner except that a ratio of one mole of titanium tetrachloride to 2.7 moles of oxygen was used and a yield of 98.9% of titanium dioxide having satisfactory pigmentary qualities was obtained with substantially no production of coarse crystals.

*Example III.*—A similar test was run at a temperature of 1840° F. with a ratio of one mole of titanium tetrachloride to 3.85 moles of oxygen and a 89% yield of titanium dioxide was obtained. Only a small quantity of coarse titanium dioxide crystals was formed.

*Example IV.*—Operating in the same manner as in the previous example 3 moles of oxygen and one mole of titanium tetrachloride were continuously introduced into the chamber at a temperature of 1600° F. and a yield of 88% was obtained with no substantial production of coarse crystals.

The ratio of oxygen to titanium tetrachloride may be widely varied but in general an excess of oxygen may be desirable. Air, ozone or other suitable oxidizing gas or gaseous mixture may be used in place of oxygen.

The titanium dioxide produced by this process is usually in the form of a fine fluffy dust or powder which is suspended in the gaseous medium of the reaction chamber. The suspension may be precipitated by suitable means, as for example, by conveying the gases to a suitable collecting means such as a settling chamber, providing a large zone of quiescence as will be understood by those skilled in the art. In some cases the provision of an electrostatic precipitator may be advantageous to promote complete precipitation of the powder. If necessary this powder may be further calcined to remove last traces of chlorine.

The titanium tetrachloride used in this process may be obtained from any convenient source. If desired, it may be secured by chlorination of ilmenite or other titanium ores and subsequent purification of the chlorinated product. While it is usually preferred that the tetrachloride be relatively pure, this is not essential since the titanium halide may be decomposed in the presence of or simultaneously with other metallic halides and occasionally it may be convenient to oxidize a product containing impurities such as compounds of iron, silica, zirconium, etc. In general, however, it is preferred to treat substantially iron-free material since the presence of iron tends to decrease the whiteness of the dioxide.

The reaction chamber may be of any convenient construction and an upright cylinder has been found to be suitable for this purpose. After considerable use it may be found that a fluffy titanium dioxide powder accumulates upon the walls of the chamber and it may be desirable to periodically or continuously remove this powder. This may be done in any suitable manner, as for example, by blowing air through the tube. If desired, these accumulations may be prevented by introducing a portion of the gases and/or titanium tetrachloride vapor into the chamber at very high velocities.

The accompanying drawing is a diagrammatic sectional view of an illustrative form of apparatus which is suitable for use in accordance with my invention. In this embodiment I provide a vertically arranged furnace 1, which is equipped with a reaction chamber 12, and preheating zone 8. Suitable heating elements 3, are provided adjacent the preheating chamber 8, and the furnace may be covered partially or completely with insulation 13. Vertically disposed, concentrically arranged tubes 5 and 6, extend through the preheating zone and into the reaction space.

In the operation of this device a stream of preheated titanium tetrachloride vapor is introduced into tube 5, and heated nitrogen is introduced into tube 6, through inlet tube 7, while a stream of oxygen is admitted at inlet 9. The gases passing through the preheating zone are heated to reaction temperature. Thermal decomposition of the titanium tetrachloride at the terminal portion of tube 5, is prevented by the fluid envelope of inert gas which is discharged from tube 6, about the end of tube 5, thus preventing an accumulation of oxygen adjacent the tetrachloride jet. The titanium tetrachloride vapor is thus swept into reaction zone 12, of suitable size and is decomposed before contact with the hot walls of the chamber can occur. The exhaust gases are then swept into a suitable separating chamber 4, wherein the fine titanium dioxide produced is deposited. The gases may then be discharged to a suitable collector (not shown) through outlet 10, while titanium dioxide may be withdrawn through a conveniently disposed door 11.

The process is not limited to the oxidation of the tetrachloride but may be applied to the oxidation of other halides such as titanium trichloride, titanium tetrafluoride, etc.

Although the invention has been described in connection with the details of certain embodiments thereof, it is not intended that such details be considered as limitations upon the invention except insofar as they are included in the accompanying claims.

I claim:

1. The method of producing titanium dioxide suitable for use as a pigment which comprises subjecting vaporized titanium halide to thermal decomposition by means of oxygen within a reaction chamber and minimizing crystal formation by maintaining the titanium halide vapor out of substantial contact with hot surfaces within the chamber during the major portion of said decomposition.

2. The method of producing titanium dioxide suitable for use as a pigment which comprises subjecting vaporized titanium tetrachloride to thermal decomposition in the presence of oxygen and maintaining the titanium terachloride vapor out of substantial contact with hot surfaces during the major portion of said decomposition.

3. The method of producing titanium dioxide which comprises subjecting vaporized titanium tetrachloride to thermal decomposition in the presence of oxygen at a temperature of 1500–1850° F. and maintaining the titanium tetrachloride vapor out of substantial contact with hot surfaces during the major portion of said decomposition.

4. The method of producing titanium dioxide which comprises subjecting vaporized titanium tetrachloride to thermal decomposition in an oxidizing atmosphere at a temperature not substantially below 1500° F. and minimizing substantial crystal formation by maintaining the titanium tetrachloride vapor out of substantial 5. As an improvement in the process of producing titanium dioxide by thermal decomposition of titanium tetrachloride while minimizing formation of coarse crystals by preventing thermal decomposition of the tetrachloride adjacent hot surfaces, the step of preventing oxidation of the tetrachloride adjacent the inlet of said chamber and consequent formation of large crystals which comprises introducing titanium tetrachloride into an oxidizing atmosphere through a non-oxidizing gas.

6. As an improvement in the process of producing titanium dioxide by thermal decomposition of titanium tetrachloride while minimizing formation of coarse crystals by preventing thermal decomposition of the tetrachloride adjacent hot surfaces, the step of preventing oxidation of the tetrachloride adjacent the inlet of said chamber and consequent formation of large crystals which comprises introducing titanium tetrachloride into an oxidizing atmosphere through nitrogen.

7. As an improvement in the process of producing titanium dioxide by thermal decomposition of titanium tetrachloride while minimizing formation of coarse crystals by preventing thermal decomposition of the tetrachloride adjacent hot surfaces, the step of preventing oxidation of the tetrachloride adjacent the inlet of said chamber and consequent formation of large crystals which comprises introducing titanium tetrachloride into an oxidizing atmosphere through carbon dioxide.

8. The method of producing titanium dioxide suitable for use as a pigment which comprises introducing oxygen into one portion of a reaction chamber, introducing titanium tetrachloride into a second portion of said chamber, maintaining a body of nonoxidizing gas in said second portion adjacent the inlet of the tetrachloride whereby substantial decomposition of the tetrachloride at its point of entry into the chamber and consequent crystal formation is minimized and reacting the tetrachloride with the oxygen in the reaction chamber.

9. The method of producing titanium dioxide suitable for use as a pigment which comprises introducing oxygen into one portion of a reaction chamber, introducing titanium tetrachloride into a second portion of said chamber, maintaining nitrogen in said second portion adjacent the inlet of the tetrachloride whereby substantial oxidation of the tetrachloride at its point of entry into the chamber and consequent crystal formation is minimized and reacting the tetrachloride with the oxygen in the reaction chamber.

10. The method of producing titanium dioxide suitable for use as a pigment which comprises introducing oxygen into one portion of a reaction chamber, introducing titanium tetrachloride into a second portion of said chamber, maintaining carbon dioxide in said second portion adjacent the inlet of the tetrachloride whereby substantial oxidation of the tetrachloride at its point of entry into the chamber and consequent crystal formation is minimized and reacting the tetrachloride with the oxygen in the reaction chamber.

11. The method of producing finely divided titanium dioxide suitable for use as a pigment which comprises introducing titanium tetrachloride into a reaction chamber and minimizing substantial crystal formation by thermally decomposing said tetrachloride in the vapor state by means of oxygen before substantial contact of the tetrachloride with hot surfaces within said chamber can occur.

12. The method of preparing titanium dioxide which comprises introducing vaporized titanium tetrachloride and oxygen into a reaction chamber at a temperature sufficiently high to decompose the tetrachloride, preventing decomposition of the tetrachloride and consequent formation of large crystals adjacent the tetrachloride inlet by maintaining a body of a gas which is substantially unreactive to the tetrachloride adjacent said inlet and thermally decomposing said tetrachloride before substantial contact of the tetrachloride with hot surfaces can occur.

13. As an improvement in the process of thermally decomposing titanium tetrachloride at high temperatures, while minimizing crystal formation by preventing thermal decomposition of the tetrachloride adjacent hot surfaces, the step which comprises introducing vaporized titanium tetrachloride into a reaction chamber and preventing substantial decomposition thereof adjacent the tetrachloride inlet by maintaining the atmosphere adjacent said inlet substantially free of oxygen.

14. As an improvement in the process of thermally decomposing vaporized titanium tetrahalide at high temperatures, while minimizing crystal formation by preventing thermal decomposition of the tetrahalide adjacent hot surfaces, the step which comprises introducing a titanium tetrahalide into a reaction chamber and preventing substantial decomposition thereof adjacent the tetrahalide inlet by maintaining the atmosphere adjacent said inlet substantially free of oxygen.

15. A method of preparing titanium dioxide suitable for use as a pigment while minimizing crystal formation which comprises introducing titanium tetrachloride into a reaction chamber, thermally reacting the tetrachloride with oxygen at a temperature sufficiently high to permit rapid and substantially complete oxidation of the tetrachloride and minimizing formation of crystals during the reaction by conducting the reaction between the tetrachloride and oxygen in a zone within the chamber spaced from the hot surfaces thereof.

16. The method of producing titanium dioxide suitable for use as a pigment while minimizing crystal formation which comprises subjecting vaporized titanium tetrachloride to thermal decomposition within a reaction chamber by means of oxygen at a temperature sufficiently high to permit rapid and substantially complete oxidation of the tetrachloride, and minimizing crystal formation by conducting the decomposition out of substantial contact with hot surfaces within the reaction chamber.

17. The method of producing titanium dioxide suitable for use as a pigment while minimizing crystal formation which comprises subjecting vaporized titanium tetrachloride to thermal decomposition within a reaction chamber by means of oxygen at a temperature not substantially below 1500° F., and minimizing crystal formation by conducting the decomposition out of substantial contact with hot surfaces within the reaction chamber.

IRVING E. MUSKAT.